10/20/87 XR 4,701,219

United States Patent [19]

Bonee

[11] Patent Number: 4,701,219

[45] Date of Patent: Oct. 20, 1987

[54] INHIBITING LEACHING OF METALS FROM CATALYSTS AND SORBENTS AND COMPOSITIONS AND METHODS THEREFOR

[75] Inventor: Joseph C. Bonee, Ashland, Ky.

[73] Assignee: Ashland Oil, Inc., Ashland, Ky.

[21] Appl. No.: 870,653

[22] Filed: May 30, 1986

Related U.S. Application Data

[63] Continuation of Ser. No. 349,280, Feb. 8, 1982, abandoned.

[51] Int. Cl.[4] .................... C04B 2/02

[52] U.S. Cl. .................... 106/118; 106/85; 210/751; 210/901; 210/912; 405/129

[58] Field of Search .................... 106/118, 119, 85, 900; 208/13, 52 CT; 210/702, 667, 710, 724, 726, 751, 901, 912; 405/128, 129, 263; 502/521

[56] References Cited

U.S. PATENT DOCUMENTS

| | | | |
|---|---|---|---|
| 3,835,021 | 9/1974 | Lorenz et al. | 210/777 |
| 3,837,872 | 9/1974 | Conner | 106/74 |
| 3,904,498 | 9/1975 | Hesse et al. | 208/13 |
| 3,968,036 | 7/1976 | Liles et al. | 210/631 |
| 4,018,679 | 4/1977 | Bolsing | 210/751 |
| 4,018,867 | 4/1977 | Lee | 210/751 |
| 4,028,240 | 6/1977 | Manchak, Jr. | 210/751 |
| 4,116,705 | 9/1978 | Chappell | 210/751 |
| 4,124,405 | 11/1978 | Quienot | 210/912 |
| 4,142,912 | 3/1979 | Young | 106/98 |
| 4,149,968 | 4/1979 | Kupiec et al. | 210/751 |
| 4,243,514 | 1/1981 | Bartholic | 208/91 |
| 4,268,188 | 5/1981 | Bertus et al. | 405/129 |
| 4,299,687 | 11/1981 | Myers et al. | 208/113 |
| 4,309,274 | 1/1982 | Bartholic | 208/80 |
| 4,432,890 | 2/1984 | Beck et al. | 502/62 |
| 4,513,093 | 4/1985 | Beck | 502/84 |
| 4,551,231 | 11/1985 | Kovach et al. | 208/52 CT |

*Primary Examiner*—Peter Hruskoci
*Attorney, Agent, or Firm*—Richard C. Willson, Jr.; Stanley M. Welsh

[57] ABSTRACT

During use in hydrocarbon conversion processes, sorbents, e.g. for carbon and metals, and catalysts become contaminated with metals, e.g. heavy metals such as vanadium, nickel and sodium. Leaching of heavy metals can be sharply reduced prior to disposal of such spent particulate materials by treatment with alkaline earth metal compound, e.g. lime, calcium fluoride, calcium sulfate, and barium chloride. Surprisingly, calcium chloride, calcium carbonate, sodium bicarbonate are relatively ineffective.

7 Claims, 1 Drawing Figure

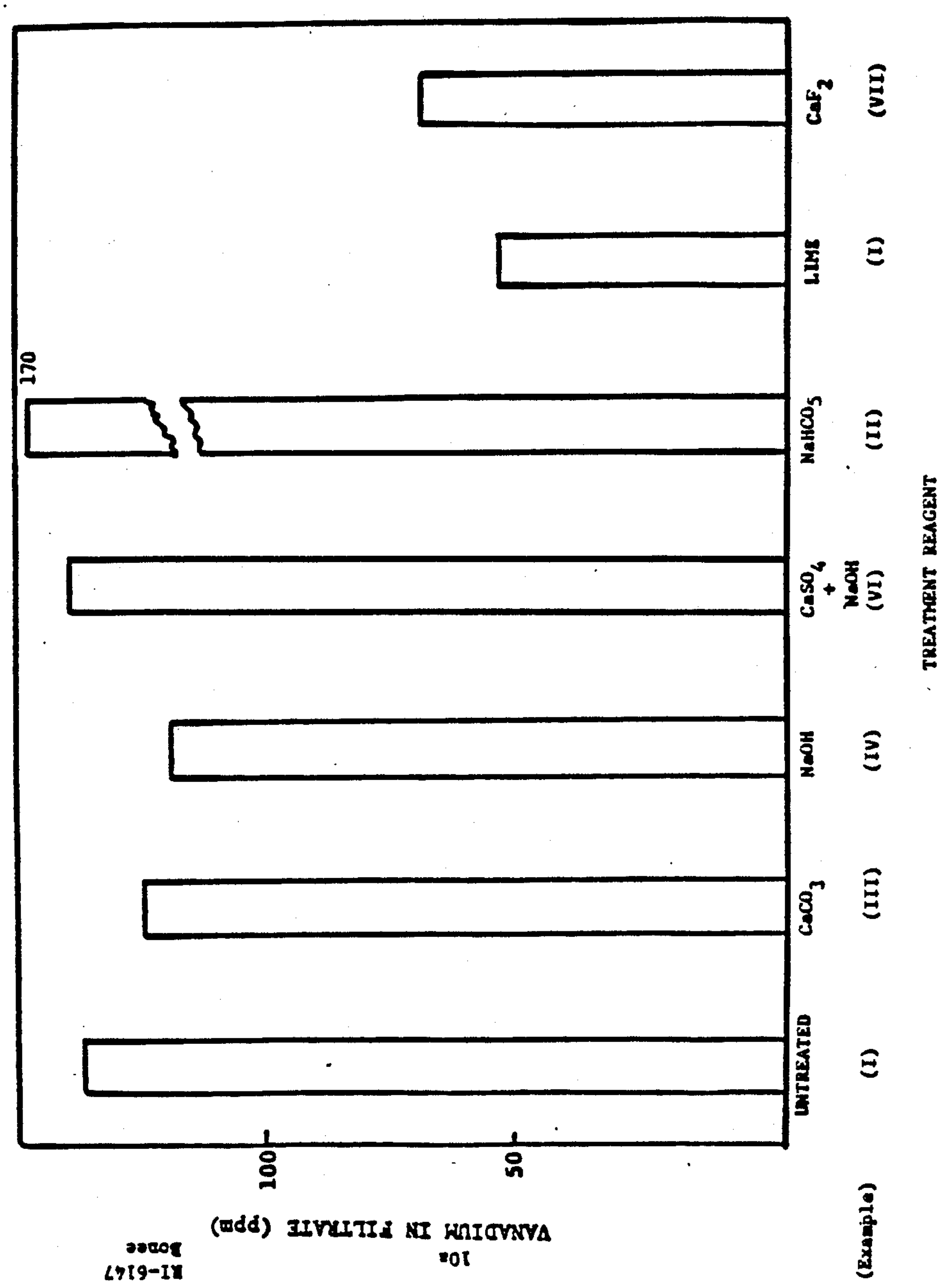
VANADIUM IN FILTRATE (ppm)
100
50
170
(Example)
UNTREATED
(I)
CaCO3
(III)
NaOH
(IV)
CaSO4 + NaOH
(VI)
NaHCO3
(II)
LIME
(I)
CaF2
(VII)
TREATMENT REAGENT

INHIBITING LEACHING OF METALS FROM CATALYSTS AND SORBENTS AND COMPOSITIONS AND METHODS THEREFOR

CROSS REFERENCES TO RELATED APPLICATIONS

This application is a continuation of application Ser. No. 349,280, filed Feb. 8, 1982 now abandoned.

The present application describes the treatment of spent particulate matter used during hydrocarbon treatment processes. It relates to techniques also disclosed in U.S. patent applications Ser. Nos. 311,725 filed Oct. 13, 1981 now abandoned; 277,752 filed Mar. 19, 1981 now U.S. Pat. No. 4,513,093; and 277,751 filed Mar. 30, 1981 now U.S. Pat. No. 4,432,890.

BACKGROUND OF THE INVENTION

1. Field of the Invention

The invention relates to disposal of spent materials and catalyst/sorbent treatment.

2. Description of the Prior Art

A variety of prior art patents have taught the immobilization of heavy metals in industrial wastes to make the waste suitable for disposal in a sanitary landfill, e.g., U.S. Pat. No. 4,142,912 to Young; U.S. Pat. No. 4,268,188 to Bertus, et al; U.S. Pat. No. 4,149,968 to Kupiec, et al; and U.S. Pat. No. 3,837,872 to Connor. Bertus, et al teach the immobilization of metal contaminants in petroleum conversion or cracking catalysts by treatment of tin or indium or their compounds. Kupiec, et al teach the immobilization of heavy metals by treating an alkaline slurry of waste with a mixture of bentonite clay and Portland cement. However, the present invention provides a new way of immobilizing nickel and vanadium using specific selected alkaline earth compounds, which depending on the choice can be cheap, readily available industrial chemicals.

SUMMARY

General Statement of the Invention

The disposal in landfills of waste particulate matter used in hydrocarbon treatment processes may be precluded by the high levels of nickel and vanadium which can be leached from these wastes by rain and ground water. The present invention immobilizes these metals, as shown by the EP Toxicity Test Procedure noted below, by the use of cheap, readily accessible alkaline earth compounds. With this procedure, the leachability of the nickel and vanadium is diminished, usually allowing a simple landfill disposal which would not otherwise be permitted.

Utility of the Invention

The invention converts the waste particulate used in hydrocarbon treatment processes into a material which has a lower leachability of nickel and vanadium as determined by the Environmental Protection Agency's (EPA's) E.P. "Toxicity Test Procedure," Vol. 45 Federal Register No. 98, page 33,127 (May 19, 1980). Such treated waste material with high nickel and vanadium content can then be discarded in a landfill, a method of the disposal which might not be permitted had the leachability of the metals not been diminished.

BRIEF DESCRIPTION OF THE DRAWING

The FIGURE is a bar graph of certain of the Examples, showing comparative concentration of heavy metals in leachate from the particulate material after treatment with various reagents.

DESCRIPTION OF THE PREFERRED EMBODIMENT

Starting Materials

Catalysts: The catalysts utilized with the present invention can be any of the catalysts used for hydrocarbon conversion processes or other chemical processes, e.g. silica, silica alumina, molecular sieve, etc. including without limitation those manufactured by Davison Chemical, division of W. R. Grace, by Filtrol Corporation, by Engelhard Corporation, and by UOP, Inc. among others. The catalysts may have been prepared by incorporation of heavy metals or may become contaminated with heavy metals derived from the hydrocarbons or other feedstocks process by the use of the catalysts. Typical heavy metal contaminants include vanadium, nickel and sodium. The catalysts are typically of $\frac{1}{8}$" major dimension but they may be larger or smaller and catalyst dust or fines may also be treated by the process of the invention. Processes in which such catalysts (or sorbents discussed below) may have been used include those described in U.S. Pat. No. 4,299,687 to Myers and Busch; U.S. Pat. No. 4,243,514 to Bartholic; and U.S. Pat. No. 4,309,274 to Bartholic.

Sorbents: Sorbents treatable by the present invention comprise those manufactured by the aforementioned catalyst companies and commonly used for removal of heavy metals from, e.g. residual fractions derived from crude oil which frequently contain objectionably high concentrations of heavy metals which must be removed to avoid poisoning of downstream hydrocarbon conversion catalysts. The size and shape of the sorbents are not narrowly critical but will generally be similar to those described above with respect to catalysts.

Contaminants: Although the invention has been tested and proven particularly useful with heavy metals, e.g. V, Ni and Na, it will generally be useful for stabilizing certain other contaminants which may leach from spent hydrocarbon conversion, and other, catalysts and sorbents.

Treating agents: The treating agents of the present invention are carefully selected and include most preferably lime out of either slaked or unslaked, calcium fluoride, calcium sulfate, and barium chloride. By "lime" is meant the commercial form of calcium hydroxide or, in its unslaked version, the commercial form of calcium oxide. Purer calcium oxide or calcium hydroxide grades may, of course, be utilized but they would prove in most cases to be of unnecessarily expensive. Calcium fluoride is more preferred among the aforementioned reagents but calcium oxide and most preferably calcium hydroxide in the form of commercial lime generally proves to be the most advantageous reagent for most applications.

Treatment Quantities: Excessive use of the reagents themselves can be deliterious and can violate EPA regulations or fail to meet EPA standards for sanitary disposal landfills. For this reason and for economic reasons, the concentration of treatment reagents will preferably be from one to twelve percent by weight based on the weight of the sorbents or catalysts being treated, more preferably from 3 to about 10% on that basis and most preferably from about 4 to about 8% on the same basis.

Techniques for Treatment: The ingredients are preferably mixed as dry powders though slurries could be employed in specialized circumstances. The dry powder may be admixed by any conventional method, e.g. by blowing, dusting, turning in a ball mill with the balls removed, or by simply dumping the treatment reagent over a reasonably thin layer of catalyst or sorbent to be treated and then blading with a bulldozer to produce a mixing effect. After treatment, for safety reasons, a layer of at least about two feet of soil should be leveled over the deposit of treated catalyst or sorbent.

Temperatures: The temperatures will generally be ambient although materials may be slightly warmed to enhance the speed of reaction where desired.

Batch or Continuous Basis: The invention will generally be practiced on a batch of spent catalyst or sorbent received at any given time but can, of course, be practiced continuously with spent sorbent or catalyst being continuously withdrawn and continuously treated.

EXAMPLES

EXAMPLE I

Treatment of Heavy Metal Contaminated Sorbent with Lime to Reduce Leaching According to the Present Invention.

Powdered commercial unslaked lime (10 g.) is added to spent sorbent (100 g.) from a metal removal system (MRS) operating on reduced crude containing high levels of vanadium and nickel and mixed by mixing in a 250 ml. laboratory bottle for about two minutes. The resulting admixture is then leached with the 1600 ml. of water for 24 hours according to the techniques described in the EP toxicity test mentioned above. The resulting leachate contains 55 ppm by weight (ppm) of vanadium as compared to 135 ppm for identical leachate prepared from the same MRS sorbent without treating with lime prior to conducting the test. The leachate contains 0.1 ppm nickel as compared with 1.8 ppm nickel in the leachate prepared from the same MRS sorbent without treatment with lime. Sodium level is reduced to 10 ppm sodium as compared to 14 ppm sodium without treatment with lime.

These results and the results of the examples which follow are tabulated in Table I.

TABLE I

| Example | Additive | Concentration of Additives (Wt. %) Based on Weight of Dry Sorbent | Concentration of Metal in Filtrate (ppm) V | Ni | Na |
|---|---|---|---|---|---|
| I | None | None | 135 | 1.8 | 14 |
| II | $NaHCO_3$ | 27.6% | 170 | * | * |
| III | $CaCO_3$ | 20.6% | 123 | * | * |
| IV | NaOH | 2% | 117 | * | * |
| V | $CaSO_4$ | 10% | 112 | * | * |
| VI | $CaSO_4$ + NaOH | 10% 4.2% | 137 | * | * |
| I | Powdered Lime | 10% | 55 | 0.1 | 10 |
| VII | $CaF_2$ | 10% | 69 | 0.3 | 12 |

*not measured as V was unacceptably high

EXAMPLE II

Comparative Example Utilizing Sodium Bicarbonate in Place of Lime.

When the techniques of Example I are repeated utilizing sodium bicarbonate, $NaHCO_3$ in place of lime, the concentration of Vanadium in the filtrate is 170 ppm as compared with 55 ppm using lime on the same sorbent even though the concentration of sodium bicarbonate is 27.6% by weight based on the weight of the sorbent as compared with only 10% lime.

EXAMPLE III

Using Similar Techniques, Various Other Agents Are Tested in the Invention With the Results Shown in Table I.

Modifications of the Invention: While the invention is not to be considered as being limited by the above examples, they will serve to illustrate the invention to those skilled in the art who will understand that the invention is subject to a variety of modifications without departing from the spirit thereof including without limitation, use with catalysts from reactions other than hydrocarbon conversion, etc.

What is claimed is:

1. In a process for treating waste particulate matter having a metal selected from the group consisting of vanadium, nickel and a mixture of vanadium and nickel deposited thereon during hydrocarbon treatment processes, to substantially stabilize against leaching of said metal by rain and ground waters, the improvement consisting essentially of mixing said waste particulate matter with a treating agent selected from the group consisting of lime, calcium fluoride, and calcium hydroxide, in an amount of from about 1% to about 12% by weight based on the weight of said waste particulate matter, to stabilize said metal against said leaching, wherein said waste particulate matter is spent catalyst from a petroleum catalytic cracking process or sorbent from a process for removing said metal from residual fractions derived from crude oil, whereby said waste particulate matter can be then discarded in a landfill.

2. A process as described in claim 1 wherein said treating agent is mixed in an amount of from about 2% to about 10% by weight based on the weight of said waste particulate matter.

3. The process of claim 1 wherein the treating agent consists essentially of commercial lime.

4. A process for treating a metal contaminated material which has been contaminated by at least one compound of a metal selected from the group consisting of vanadium, nickel, and mixtures thereof, said metal being deposited from hydrocarbons which contain such a metal during a hydrocarbon conversion process to substantially stabilize against leaching of said metal by rain and ground waters, wherein said metal contaminated material is spent catalyst from a petroleum catalytic cracking process or sorbent from a process for removing said metal from residual fractions derived from crude oil, said process comprising: contacting said contaminated material with an effective amount of a treating agent selected from the group consisting of calcium fluoride, calcium oxide, calcium hydroxide, and mixtures of two or more thereof to stabilize said metal against said leaching, whereby said metal contaminated material can then be discarded in a landfill.

5. A process of claim 4, wherein said treating agent is present in amount of from about 1% to about 12% by weight based on the weight of said contaminated material.

6. The process of claim 4, wherein said hydrocarbon conversion process is a petroleum catalytic cracking process.

7. The process of claim 4, wherein said metal contaminated material is a sorbent from a process for removing said metal from residual fractions derived from crude oil.

* * * * *